Dec. 26, 1961  M. S. JOHNSON  3,014,436
LADING TIE ANCHOR MEANS
Filed April 25, 1958  5 Sheets-Sheet 1
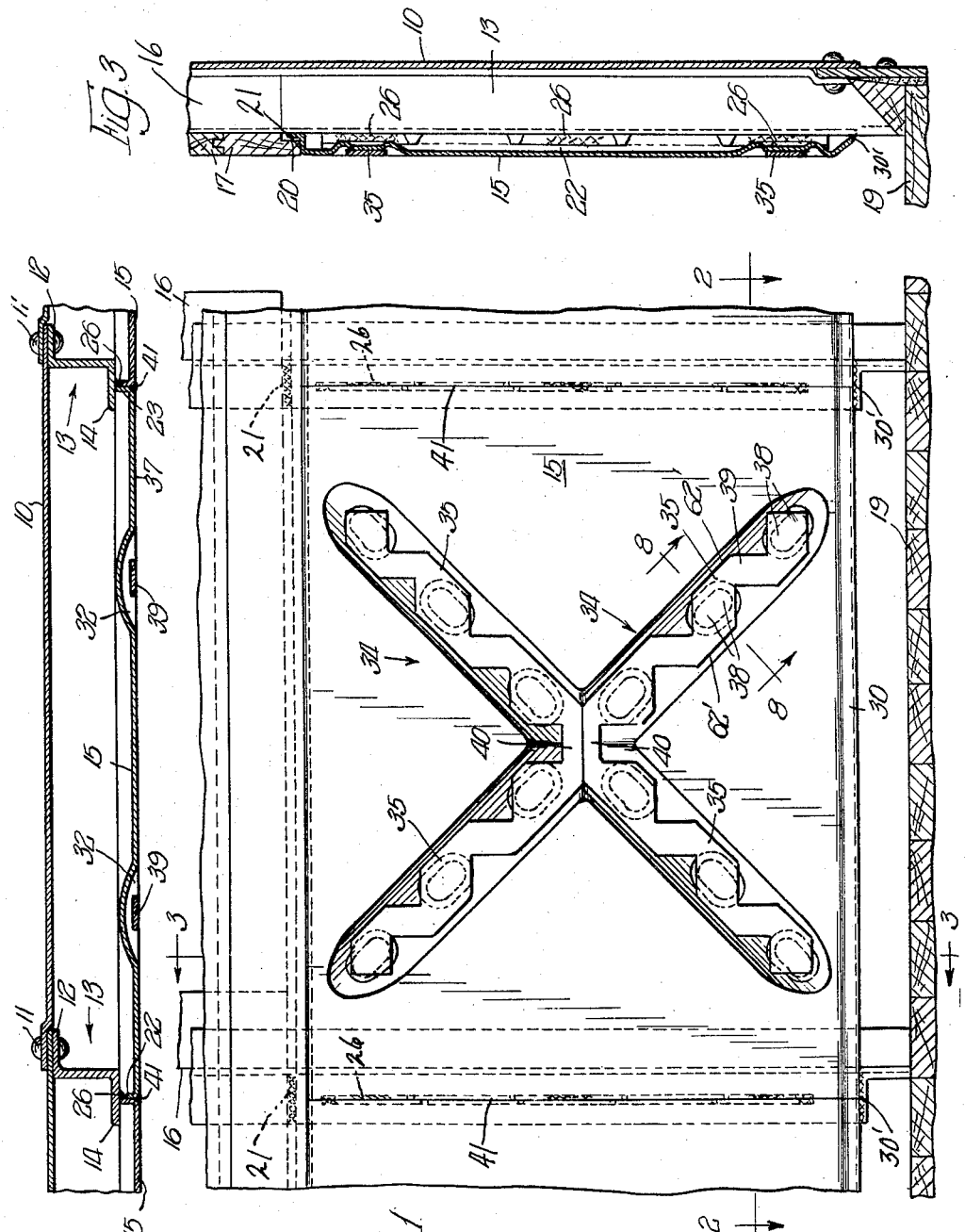
INVENTOR.
Malcolm S. Johnson,
BY
Robert R. Lockwood
Atty Dec. 26, 1961  M. S. JOHNSON  3,014,436
LADING TIE ANCHOR MEANS
Filed April 25, 1958  5 Sheets-Sheet 2
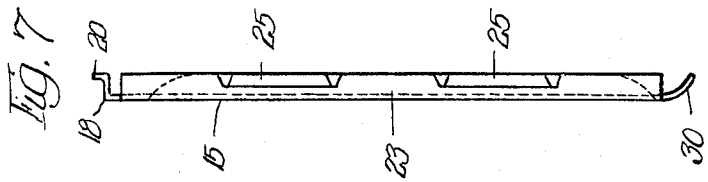
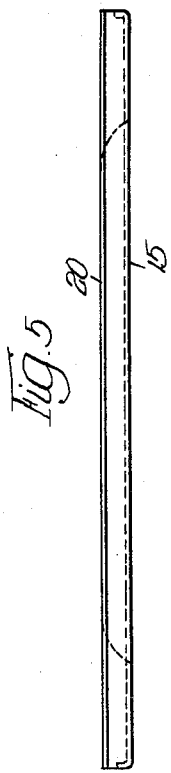
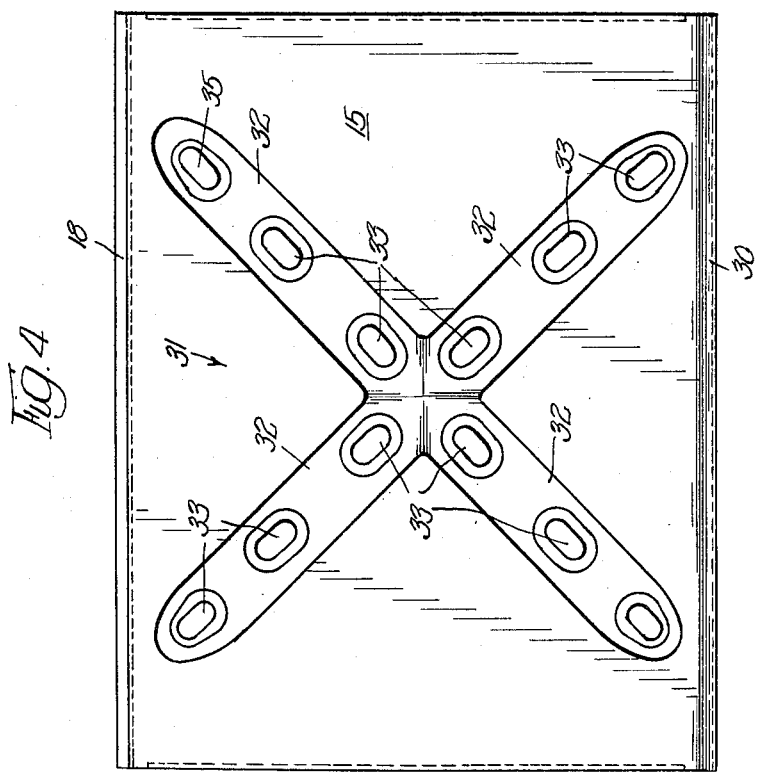
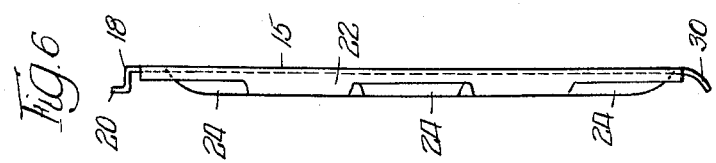
INVENTOR.
Malcolm S. Johnson,
BY
Robert R. Lockwood
Atty.

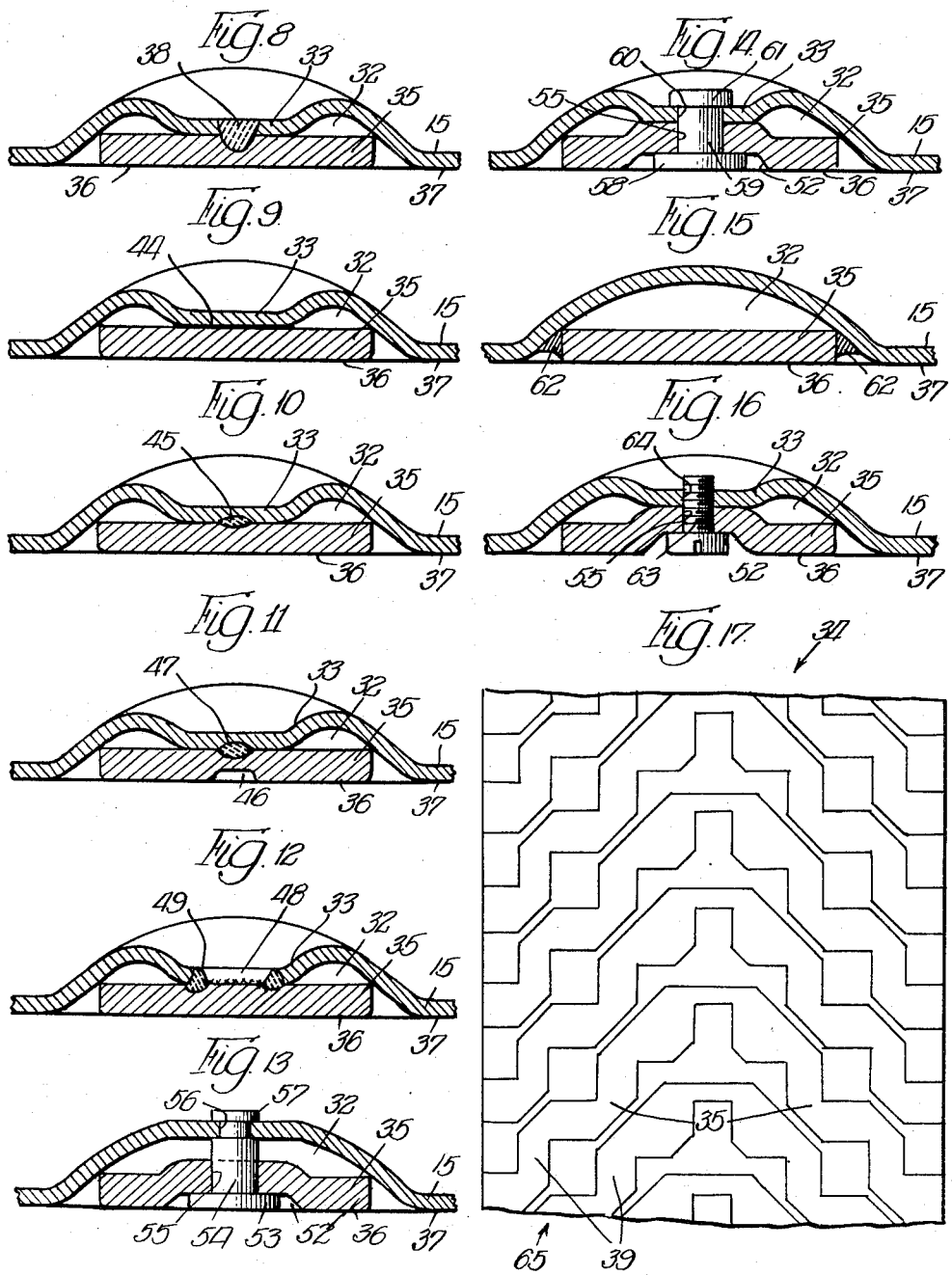

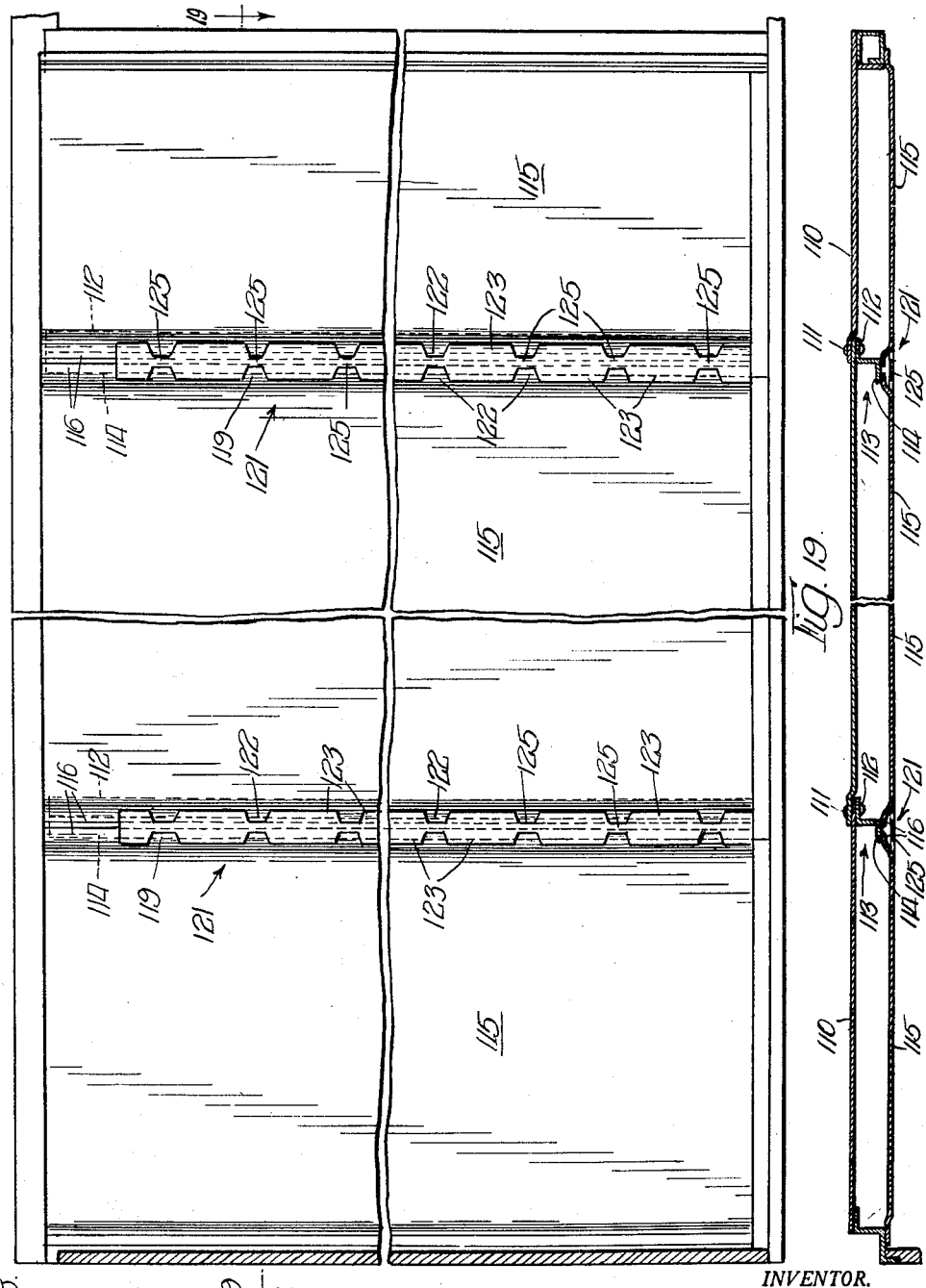

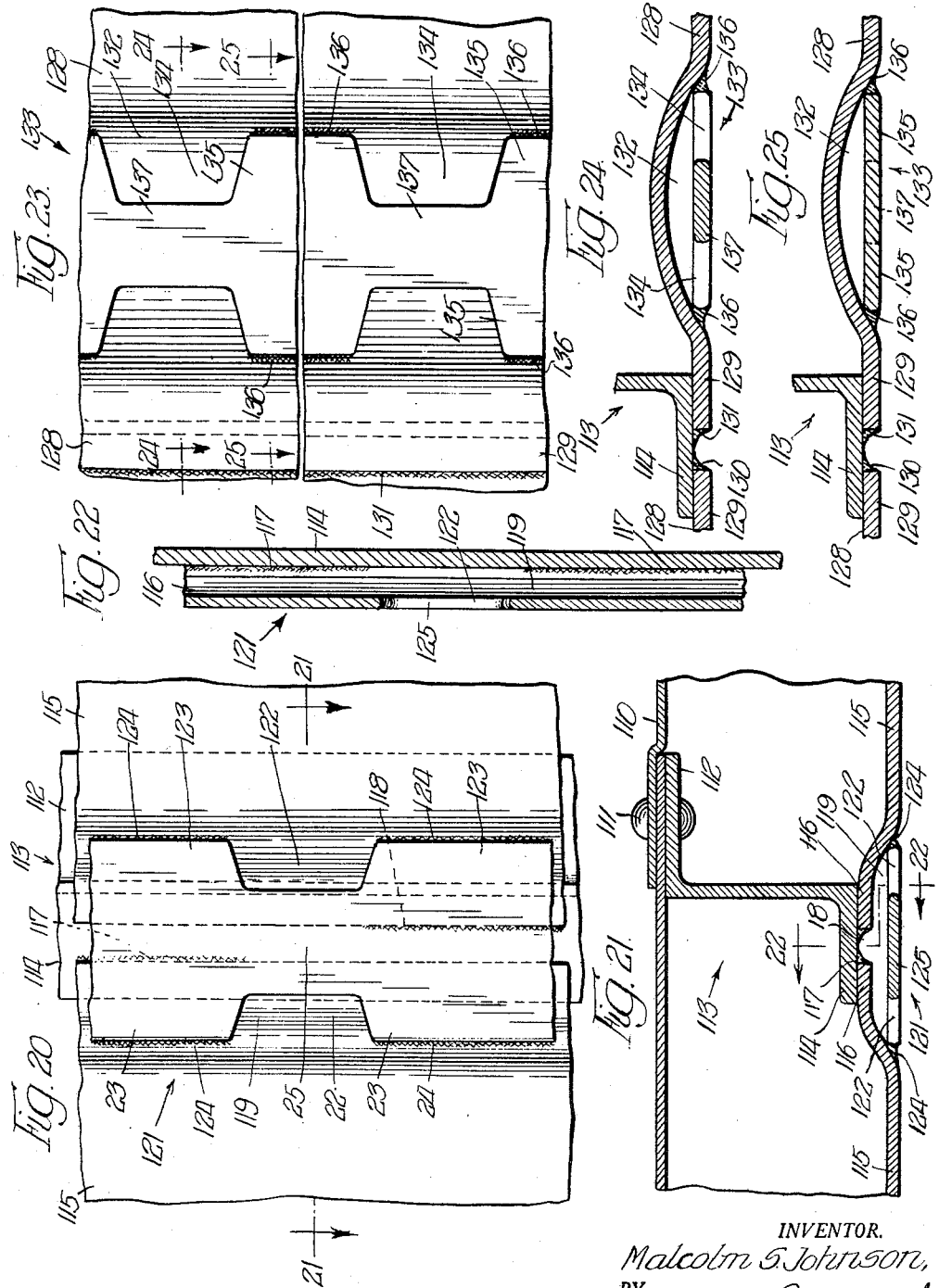

United States Patent Office 3,014,436
Patented Dec. 26, 1961

3,014,436
LADING TIE ANCHOR MEANS
Malcolm S. Johnson, Flossmoor, Ill., assignor to Illinois Railway Equipment Company, Chicago, Ill., a corporation of Illinois
Filed Apr. 25, 1958, Ser. No. 731,013
6 Claims. (Cl. 105—369)

This invention relates, generally, to lading tie anchors and it has particular relation to such devices for use in freight cars, trailers and the like. This application is a continuation-in-part of application Serial No. 579,634, filed April 20, 1956, now abandoned, and of application Serial No. 642,851, filed February 27, 1957, now abandoned.

Among the objects of this invention are: To provide an inner wall or lining member for a freight car or a truck trailer that is capable of withstanding severe usage and provides means for receiving lading ties to secure lading against movement; to provide such a construction which can be employed along side and end walls; to reinforce a metallic plate for such purpose by grooving the same and positioning a lading tie receiving bar in the groove; to employ such a construction to reduce the thickness of the required sheet and thereby reduce the weight and cost of making the car or trailer; to provide an X-shaped groove centrally of the plate and to secure therein zigzag retaining bar means arranged to receive horizontal and/or vertical lading ties; to form spaced protuberances along the bottom of the groove to which the retaining bar means is secured by welding or riveting or bolting; to secure the retaining bar means in the groove by welding the former to the edges of the later at spaced locations; to employ a pair of complementary V-shaped retaining bars as the retaining bar means; to blank the complementary V-shaped retaining bars from a flat sheet with a minimum of scrap loss; to so form the ends of the plate as to facilitate arc welding to vertical metallic side posts and to interfit with endwise disposed adjacent plates; and to provide notched outwardly turned flanges at the ends of the plate with the notches alternating to overlie the welds of adjacent plates.

Among additional objects of this invention are: To provide improved lading tie anchor means that is simple and efficient in operation and which can be readily and economically manufactured and installed; to provide vertically extending inwardly opening grooves in metallic plate forming part or all of a freight car lining and to secure therein an anchor bar to which lading ties can be secured; to provide the anchor bar with serrated edges and to fasten the serrations to the adjacent edges of the grooves, the portions between serrations providing lading tie receiving means spaced from the bottom and sides of the grooves; to have the inner surface of the anchor bar flush with the inner surface of the metallic plate; to form the grooves in overlying relation with respect to the side posts of the car; and to form the grooves between adjacent side posts.

Other objects of this invention will, in part, be obvious and in part appear hereinafter.

This invention is disclosed in the embodiments thereof shown in the accompanying drawings and it comprises the features of construction, combination of elements and arrangement of parts that will be exemplified in the constructions hereinafter set forth and the scope of the application of which will be indicated in the appended claims.

For a more complete understanding of the nature and scope of this invention reference can be had to the following detailed description, taken together with the accompanying drawings, in which:

FIGURE 1 is a view, in front elevation, of a metallic wall plate for a freight car or a trailer in which the present invention is embodied, the plate being shown in assembled relation with similar plates in a freight car wall construction;

FIGURE 2 is a horizontal sectional view taken generally along the line 2—2 of FIGURE 1;

FIGURE 3 is a vertical sectional view taken generally along the line 3—3 of FIGURE 1;

FIGURE 4 is a view, in front elevation, of the plate per se;

FIGURE 5 is a top plan view of the plate shown in FIGURE 4;

FIGURE 6 is a view in end elevation of the plate shown in FIGURE 4, the view being taken looking from left to right;

FIGURE 7 is a view, in end elevation, of the plate shown in FIGURE 4, the view being taken looking from right to left;

FIGURE 8 is a detail sectional view at an enlarged scale taken generally along the line 8—8 of FIGURE 1 and showing one form of means for fastening the bar in the groove;

FIGURE 9 is a view, similar to FIGURE 8, showing how the retaining bar can be secured in position by copper brazing;

FIGURE 10 is a view, similar to FIGURE 8, showing how the retaining bar can be secured in position by spot welding;

FIGURE 11 is a view, similar to FIGURE 8, showing how the retaining bar can be secured in position by projection welding;

FIGURE 12 is a view, similar to FIGURE 8, showing how the retaining bar can be secured in position by hand plug welding;

FIGURE 13 is a view, similar to FIGURE 8, showing how the retaining bar can be secured in position by means of shoulder rivets;

FIGURE 14 is a view, similar to FIGURE 8, showing how the retaining bar can be secured in position by flat head rivets;

FIGURE 15 is a view, similar to FIGURE 8, showing how the retaining bar can be secured in position by hand welding along the edges of the groove formed in the metallic sheet;

FIGURE 16 is a view, similar to FIGURE 8, showing how the retaining bar can be secured in position by means of self-tapping fillister head screws;

FIGURE 17 shows how the V-shaped retaining bars can be blanked out of a sheet of plate stock with a minimum of scrap loss;

FIGURE 18 is a view, partly in side elevation and partly in section, showing the interior wall construction of a freight car and illustrating the application thereto of another embodiment of this invention;

FIGURE 19 is a horizontal sectional view taken generally along the line 19—19 of FIGURE 18;

FIGURE 20 is a vertical elevational view, at an enlarged scale, of a portion of the inner wall construction as shown in FIGURE 18;

FIGURE 21 is a horizontal sectional view taken generally along the line 21—21 of FIGURE 20;

FIGURE 22 is a vertical sectional view taken generally along the line 22—22 of FIGURE 21;

FIGURE 23 is a view, similar to FIGURE 20, but showing a modified construction;

FIGURE 24 is a horizontal sectional view taken generally along the line 24—24 of FIGURE 23; and FIGURE 25 is a horizontal sectional view taken generally along the line 25—25 of FIGURE 23.

Referring now particularly to FIGURES 1, 2 and 3 of the drawings, it will be observed that the reference character 10 designates an outside sheet of the body of a freight car or a trailer or other lading container which is secured by rivets 11 to flanges 12 of vertical side posts 13 that preferably are Z-shaped metallic rolled sections provided with flanges 14 to which metallic plates 15 can be welded. Associated with each vertical side post 13 is a wood nailing strip 16 to which matched car lining boards 17 can be nailed. The vertical side posts 13 extend upwardly from a conventional wood floor 19.

The metallic plates 15 are located between the floor 19 and the lowermost car lining board 17 which is spaced slightly more than two feet from the floor. It will be understood that the plates 15 can extend higher and may cover entirely the entire side and end walls. Metallic plates are employed here rather than wood lining boards in order to minimize the damage done to the car side walls by material handling devices such as fork lift trucks which are used in loading and unloading the cars and trailers. It has been the practice in the past to employ steel plates having a thickness of ¼" for this purpose. When the present invention is employed, it is feasible to use a plate 15 having a thickness of only ⅛" since it is substantially reinforced according to the practice herein disclosed.

The upper edge of the plate 15 is provided with an upwardly extending flange 20 which underlies the lowermost lining board 17 and is welded at 21 to the respective flange 14. The construction of the metallic plates 15 is such that the inner surface thereof is substantially flush with the inner surface of the car lining boards 17 as illustrated more clearly in FIGURE 3 of the drawings.

The main body portion of each metallic plate 15 is spaced from the flanges 14 of the metallic side posts 13, as shown more clearly in FIGURES 2, 6 and 7, by having the ends 22 and 23 turned outwardly. Notches 24 and 25 are provided in the outwardly turned ends 22 and 23 to overlie the weld metal 26, FIGURE 3, that is employed for welding the portions between the notches 24 and 25 to the flanges 14. It will be observed that the notches 24 and 25 are staggered or are located in alternate relation with respect to each other. The reason for this is to permit the use of similar plates 15 in end-to-end relation and welding thereof to the flanges 14 from the inside of the trailer. The lower edge 30 of each plate 15 is turned inwardly and welded at 30' to the lower portions of the flanges 14.

Referring now particularly to FIGURE 4 of the drawings, it will be observed that the sheet 15 is provided in its central portion with an inwardly opening X-shaped groove 31. The X-shaped groove 31 is formed in the plate 15 by a suitable press with the depth of the groove being substantially equal to the width of the outwardly turned ends 22 and 23. This construction materially increases the resistance of the plate 15 to bending and thus rigidifies it so that it is possible, as indicated hereinbefore, to employ a lighter gauge sheet for the plate 15. For example, a number 11 gauge steel plate having a thickness of ⅛" can be used. Also it is possible to use an aluminum sheet where it is desired to further lighten the weight. It will be observed that the X-shaped groove 31 has the arms 32 thereof positioned at right angles to each other. As will appear hereinafter this facilitates the provision of lading tie receiving means for anchoring lading ties extending in both horizontal and vertical planes.

For the purpose of further rigidifying the construction and providing locations where retaining bars can be secured in the groove 31 protuberances 33 are formed centrally of the arms 32 in the same forming operation that produces the X-shaped groove 31. These protuberances can take the forms as shown in FIGURES 8–12, 14 and 16 as may be desired.

With a view to further reinforcing the metallic plate 15 and providing means for receiving lading ties V-shaped retaining bars 34 are employed as shown in FIGURE 1. These retaining bars are complementary with the arms 35 at right angles to each other in order to conform to the shape of the X-shaped groove 31. They may be formed from ¼" thick sheet steel. Aluminum also can be employed.

As shown more clearly in FIGURE 8 of the drawings the protuberances 33 are formed in such manner and with relation to the thickness of the arm 35 of the retaining bar 34 so that the inner surface 36 of the latter is substantially flush with the inner surface 37 of the metallic plate 15. One method for securing the retaining bars 34 in position in the arms 32 of the X-shaped groove 31 is shown in FIGURE 8. Here at 38 is indicated that a spot weld has been formed. Two spot welds or a single spot weld can be formed for each protuberance 33 as may be desired to provide the requisite strength.

It will be observed that the protuberances 33 are located in spaced positions along the central portions of the arms 32 of the X-shaped groove 31. The portions of the arms 35 of the retaining bars 34 which overlie the protuberances 33 extend generally horizontally while the portions 39 between these horizontal portions extend vertically thus providing a zigzag retaining bar construction. It is around these vertical sections 39 that lading ties or straps extending horizontally can be placed for securing lading in place against movement on the floor 19 as will be understood readily.

At the juncture between the upper and lower V-shaped retaining bars 34 complementary horizontal sections 40 are provided around which a lading tie or strap extending in a vertical plane can be positioned. If it is desired to locate the sections 39 horizontally and the sections 40 vertically, the retaining bars 34 are merely shifted through 90° and then secured in position. However, since the lading ties or straps extend in horizontal planes more often than they do in vertical planes, the arrangement shown in FIGURE 1 of the drawings ordinarily is used. It will be understood that the bottom of the groove 31 between the protuberances 33 provides a scoop which directs the placing of the lading tie around the respective lading tie securing portion. The construction is leak proof since no openings are provided through the plate 15. Further the construction is self cleaning in that no lodging places are provided where lading, such as grain, can be retained.

It will be understood that the metallic plate 15 is formed to the shape illustrated in FIGURES 4–7 of the drawings with the protuberances 33 where they are to be employed to facilitate welding of the retaining bars 34 by spot welding or like processes or where they are to be secured in position by rivets or bolts. In some instances, as will be described hereinafter, the protuberances 33 are not formed.

The V-shaped retaining bars 34 are secured in position in the X-shaped groove 31 by whatever fastening means is desired prior to the application of the plates 15 to the car. After the welds 21, 26 and 30' have been made from the inside of the car by the arc welding process, additional sheets are placed in position and welded. Then a bead 41 of weld metal is formed between adjacent plates, as illustrated in FIGURE 2, and afterward this bead is ground so as to provide a smooth surface flush with the inner surface 37 of the plates 15.

As indicated, various arrangements can be employed for securing the retaining bars 34 or the arms 35 thereof in position in the respective arm 32 of the X-shaped groove 31. They are illustrated in FIGURES 9–16.

FIGURE 9 shows the application of a layer 44 of copper brazing material between the outer surface of the arm 35 and the inner surface of the protuberance 33. After application of this material, the plates 15 with the retaining bars 34 located thereon are placed in a furnace and heated in an atmosphere of hydrogen.

In FIGURE 10 a spot weld 45 is formed between the arm 35 and the protuberance 33.

FIGURE 11 shows how a recess 46 is provided on the inner surface of the arm 35 in connection with the formation of a projection weld 47. It will be understood that the outer surface of the arm 35 opposite the recess 46 projects outwardly slightly to facilitate the formation of the projection weld.

In FIGURE 12 an opening 48 is shown in the protuberance 33 around the periphery of which weld metal 49 is deposited to secure the arm 35 in position and provide a leak proof construction.

In FIGURE 13 a recess 52 is formed in the inner surface of the arm 35 for receiving a head 53 of a shoulder rivet 54 which projects through an opening 55 in the arm 35 and has a reduced section which projects through an opening 56 in the bottom of the arm 32 of the X-shaped groove 31. The outer end of the shoulder rivet 54 is headed over as indicated at 57.

FIGURE 14 shows the application of a flat head rivet 59 for securing the arm 35 in position. As indicated at 61 it is headed over to complete the assembly.

FIGURE 15 shows a construction in which the protuberances 33 are not used. Instead the arm 35 is welded, as indicated at 62, along opposite sides to opposite edges of the arm 32 of the X-shaped groove 31. The weld metal at 62 is deposited along the edges 62', FIGURE 1, of the arms 35. This construction then provides horizontal as well as vertical lading tie receiving portions along the V-shaped retaining bars 34.

FIGURE 16 shows how a self tapping fillister head machine bolt 63 can be employed in conjunction with an opening 64 centrally of the protuberance 33 for securing the arm 35 in position.

Since the V-shaped retaining bars 34 are of complementary shape, they can be punched out of a sheet or blank that is indicated generally at 65, FIGURE 17. It will be observed that there is a minimum of scrap loss between successive bars or stampings.

The freight car construction herein disclosed, including the side sheets 10 and side posts 13, is merely illustrative of the arrangement with which the plates 15 of the present invention can be employed. Other supporting constructions can be used, such as in a trailer where the plates 15 themselves form the walls and are attached at top and bottom to framing members.

Referring now particularly to FIGURES 18 to 22 of the drawings, it will be observed that the outside car sheet is indicated at 110 and that it may be secured, as shown in FIGURE 21, by rivets 111 to a vertical flange 112 of vertical car side posts that are indicated, generally, at 113. The car side posts 113 are preferably Z-shaped metallic rolled sections having an inner flange 114 which is parallel to the outer flange 112.

The car lining is provided by metallic plates 115 which may extend part way or all of the way from the floor to the ceiling to form a lading tight lining. It will be understood that the metallic plates 115 extend between the adjacent car side posts 113. As shown in FIGURE 21 the ends 116 of the metallic plates 115 are offset outwardly so that the intermediate portions of these plates are offset inwardly toward the interior of the car. The outwardly offset ends or edges 116 of the metallic plates 115 are welded as indicated at 117 and 118 to the adjacent surface of the respective flange 114. As shown in FIGURE 20, the welds 117 and 118 are offset or are staggered.

By outwardly offsetting the ends or edges 116 of the metallic plates 115 a vertically extending groove 119 is formed which overlies the respective flange 114 of the car side posts 113. Advantage is taken of this construction to provide in each of the grooves 119 an anchor bar which is indicated, generally, at 121. The anchor bar 121 is formed of sheet metal, similar to the metallic plates 115, and is serrated on opposite sides to provide spaced notches 122 between the serrations 123. The anchor bar 121 is secured to the groove 119 by welding the serrations 123 to the edges thereof as indicated at 124. The width of the groove 119 and the width of the anchor bar 121 at the serrations 123 is such that the anchor bar 121 lies flush with the metallic plates 115 so that the inner surfaces thereof and the inner surfaces of the anchor bars 121 are in substantially the same plane.

Intermediate the serrations 123 are necked down portions 125 which are formed by the notches 122. These portions 125 are arranged to receive lading ties or steel strap which it will be understood are used to secure lading in the car against shifting. The notches 122 and the space in the groove 119 underneath the necked down portion 125 permits threading of the lading tie around the portion 125 as will be understood readily.

A modified construction is illustrated in FIGURES 23, 24 and 25 of the drawings. As there shown the same vertical car side post construction 113 is employed. Here metallic plates 128 are provided having the ends or edges 129 overlying the flange 114 and welded thereto as indicated at 130 and 131. In this modified construction a groove 132 is formed in each of the metallic plates 128 in spaced relation to one of the ends or edges 129 and it is arranged to receive an anchor bar that is indicated, generally, at 133. The anchor bar 133, like the anchor bar 121 previously described, is serrated on opposite sides to provide notches 134 between serrations 135 which are welded at 136 to the edges of the groove 132. As illustrated, the width of the groove 132 and the width of the anchor bar 133 at the serrations 135 are such that the anchor bar 133 lies flush with the inner surface of the respective metallic plate 128. Necked down portions 137 between the serrations 135 which are formed by the notches 134 provide lading tie receiving means. It will be understood that a lading tie can be threaded around the portion 137 through one of the notches 134 into the groove 132 and thence out through the other notch 134.

While the constructions disclosed herein have been described particularly with reference to railway car construction, it will be understood that these constructions also can be employed in trailers if desired.

Since certain further changes can be made in the foregoing constructions and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In a freight car construction or the like, in combination, spaced vertical metallic car side posts, inner wall members in the form of metallic plate means secured to said side posts, the intermediate portion of one or more of said plates having an X-shaped groove opening toward the interior of the car with the arms of the X-shape being spaced substantially 90° apart, retaining bar means extending lengthwise in each branch of said X-shaped groove having relatively wide spaced portions bearing against the surface of the groove with the sections of said bar between said relatively wide portions being relatively narrow and spaced by said portions from the bottom and sides of said groove and extending at an angle of substantially 45° to the longitudinal axis of said bar for receiving a lading tie around each section vertically or horizontally depending upon the relation between said arms of said X-shape and the respective bar, and means securing said relatively wide spaced portions of said bar means to the metallic plate means along said groove.

2. In a freight car construction or the like, in combination, spaced vertical metallic car side posts, inner wall members in the form of metallic plates secured to said side posts, the intermediate portion of one or more of said plates having an X-shaped groove with inclined sides opening toward the interior of the car with the arms of the X-shape being spaced substantially 90° apart, retaining bar means in the form of an X-shaped flat plate having relatively wide spaced sections spanning said groove with the sides of said sections engaging said inclined sides and with the under surface of said plate spaced from the bottom of said groove and the sections of said bar means between said relatively wide sections being relatively narrow and spaced by said relatively wide sections from the bottom and sides of said groove for receiving a lading tie around each section, said relatively narrow sections extending at an angle of substantially 45° to the longitudinal axis of the respective arm of said bar means whereby lading ties can be received therearound either vertically or horizontally depending upon the relation between said arms of said X-shape and the respective bar means, and means securing the sides of said relatively wide sections to the juxtaposed sides of said groove.

3. In a freight car construction or the like, in combination, spaced vertical metallic car side posts, inner wall members in the form of metallic plates secured to said side posts, the intermediate portion of one or more of said plates having an X-shaped groove opening toward the interior of the car with the arms of the X-shape being spaced substantially 90° apart, a pair of V-shaped retaining bars each in a pair of adjacent branches of said X-shaped groove having relatively wide spaced portions bearing against the sides of the groove with the sections of said bars between said portions being relatively narrow and spaced by said relatively wide portions from the bottom and sides of said groove for receiving a lading tie around each section, the relatively narrow sections of the arms of each V-shaped retaining bar extending in opposite directions at an angle of substantially 45° to the longitudinal axis of the respective arm whereby lading ties can be received therearound either vertically or horizontally depending upon the relation between said arms of said X-shape and said arms of said V-shaped retaining bars and means securing said relatively wide spaced portions of said bars to the respective metallic plate along said groove.

4. In a freight car construction or the like, in combination, spaced vertical metallic car side posts, inner wall members in the form of metallic plates secured to said side posts, the intermediate portion of one or more of said plates having an X-shaped groove opening toward the interior of the car with the arms of the X-shape being spaced substantially 90° apart, a pair of V-shaped retaining bars each in a pair of adjacent branches of said X-shaped groove having relatively wide spaced portions bearing against the sides of the groove with the sections of said bars between said relatively wide portions being relatively narrow and spaced by said relatively wide portions from the bottom and sides of said groove and extending vertically for receiving a lading tie around each section, the relatively narrow sections of the arms of each V-shaped retaining bar extending in opposite directions at an angle of substantially 45° to the longitudinal axis of the respective arm whereby lading ties can be received therearound either vertically or horizontally depending upon the relation between said arms of said X-shape and said arms of said V-shaped retaining bars and means securing said relatively wide spaced portions of said bars to the respective metallic plate along said groove.

5. In a freight car construction or the like, in combination, spaced vertical metallic car side posts, inner wall members in the form of metallic plates secured to said side posts having end portions notched and turned away from the interior of the car and toward said posts for welding thereto with the notches alternating at the ends to overlie the welds of adjacent plates at the respective ends, the intermediate portion of one or more of said plates having an X-shaped groove opening only toward the interior of the car with the arms of the X-shape being spaced substantially 90° apart, retaining bar means extending lengthwise in each branch of said X-shaped groove having relatively wide spaced portions bearing against the surface of the groove with the sections of said bar between said relatively wide portions being relatively narrow and spaced by said relatively wide portions from the bottom and sides of said groove and extending at an angle of substantially 45° to the longitudinal axis of said bar for receiving a lading tie around each section vertically or horizontally depending upon the relation between said arms of said X-shape and the respective bar, and means securing said relatively wide spaced portions of said bar means to the metallic plate means along said groove.

6. In a freight car construction or the like, in combination, spaced vertical metallic car side posts having inner flanges, a metallic plate extending the full distance between adjacent side posts and secured thereto and providing the interior wall of the freight car, each said metallic plate having its ends offset outwardly into engagement with the respective flange and secured thereto thereby providing a vertically extending groove overlying the respective flange, and an anchor bar in each groove with the inner surface substantially flush with the inner surfaces of the adjacent plates and providing a continuation thereof, the opposite edges of said anchor bar having one or more pairs of notches to provide at their bottoms lading tie receiving means spaced from the sides and bottom of the respective groove to provide space through which a lading tie can be inserted, the edges of said bar on opposite sides of each pair of notches being secured to the adjacent sides of the respective groove.

References Cited in the file of this patent

UNITED STATES PATENTS

| | | |
|---|---|---|
| 1,182,147 | Dake | May 9, 1916 |
| 2,316,696 | Johnston | Apr. 13, 1943 |
| 2,577,504 | Barber | Dec. 4, 1951 |
| 2,610,587 | Pietzsch | Sept. 16, 1952 |
| 2,733,670 | Sheesley et al. | Feb. 7, 1956 |
| 2,759,432 | Adler | Aug. 21, 1956 |
| 2,763,219 | Adler | Sept. 18, 1956 |
| 2,813,495 | Wright | Nov. 19, 1957 |
| 2,827,861 | Candlin | Mar. 25, 1958 |
| 2,839,013 | Gunnell et al. | June 17, 1958 |
| 2,853,959 | Goodwin | Sept. 30, 1958 |